United States Patent Office 3,436,193
Patented Apr. 1, 1969

---

3,436,193
PLUTONIUM SUBLIMATION
Albert A. Chilenskas, Chicago, Ill., assignor to the United States of America as represented by the United States Atomic Energy Commission
No Drawing. Filed Mar. 12, 1968, Ser. No. 712,391
Int. Cl. C01g 43/06, 56/00, 1/00
U.S. Cl. 23—326                                9 Claims

---

ABSTRACT OF THE DISCLOSURE

Plutonium hexafluoride is separated from volatile fission product fluorides by freezing the fluorides and subliming the plutonium hexafluoride from the solid.

---

Contractual origin of the invention

The invention described herein was made in the course of, or under, a contract with the United States Atomic Energy Commission.

Background of invention

This invention relates to a process for separating plutonium from fission products and more particularly to a process for subliming plutonium hexafluoride from a solid mixture containing gamma-active fission products.

An interhalogen fluoride volatility process is being developed to recover plutonium and unused uranium from spent nuclear fuel elements. In the process, cladding material is removed from the element and the declad fuel is charged to a fluidized bed. The fuel material is comminuted by oxidation, and thereafter, the uranium is selectively volatilized as uranium hexafluoride with bromine pentafluoride. Some fission products leave the bed with the uranium hexafluoride stream. The bromine pentafluoride converts the plutonium dioxide in the bed to nonvolatile plutonium tetrafluoride, which is thereafter volatilized as plutonium hexafluoride by reaction with fluorine. The plutonium hexafluoride stream also carries fission products with it, and it is these fission products which are separated by the process of this invention.

Summary of invention

The process of this invention comprises passing the plutonium hexafluoride stream through a cold trap to produce a solid mixture of plutonium hexafluoride and the various fission product fluorides. A carrier gas is passed through the cold trap to remove the plutonium hexafluoride as it sublimes from the solid fission products.

Description of preferred embodiment

Several experiments were conducted using an interhalogen fluoride volatility process. The fuel was obtained from the Yankee Reactor located at Rowe, Mass., and was in the form of 3.4% enriched uranium dioxide pellets clad in stainless steel jackets irradiated to give burnups of 33,200 mwd./metric ton U. The fuel had been cooled about one year prior to the start of the first experiment and one and one-half years prior to the start of the last experiment. The stainless steel jackets were mechanically removed before the fuel was loaded into a fluidized bed of alumina in a one and one-half inch diameter reactor.

The uranium dioxide pellets contained 84.6% uranium, 1.10% plutonium and various fission products and were comminuted to $U_3O_8$ and plutonium dioxide fines at 450° C. by reaction with 20 volume percent oxygen in nitrogen. The principal fission products which volatilized during the oxidation were krypton and ruthenium. About 27% or less of the detectable krypton and less than 3.3% of ruthenium present in the initial charge volatilized.

The uranium was separated as uranium hexafluoride by the use of bromine pentafluoride as a selective fluorinating agent. 13% or less of the gross beta and gamma activity volatilized with the uranium hexafluoride. Ruthenium was the principal gamma-active fission product in the uranium hexafluoride stream, but up to about 76% of the molybdenum, 2.7% of the antimony, 0.24% of the zirconium and 1.9% of the niobium also volatilized with the uranium hexafluoride. More than 99.5% of the uranium and less than 0.95% of the plutonium in the initial charge volatilized from the bed during the bromine pentafluoride fluorination and up to 87% of the measurable krypton was also released. After the bromine pentafluoride fluorination was completed, most of the plutonium remained in the bed as solid plutonium tetrafluoride.

The plutonium tetrafluoride was volatilized as the hexafluoride by passing fluorine in a nitrogen diluent through the bed. Up to about 2% of the gross beta and gamma activity volatilized with the plutonium hexafluoride stream. As in the uranium hexafluoride stream, the principal gamma-active fission product was ruthenium but molybdenum, zirconium, niobium and antimony also volatilized with the plutonium hexafluoride stream. In three of the five runs reported herein, krypton was detected in the off-gas from the plutonium hexafluoride stream as well as some tellurium. The appearance of trace amounts of krypton probably means that some of the uranium which remained in the bed after the bromine pentafluoride fluorination volatilized with the plutonium hexafluoride stream.

Five runs with the plutonium stream were made and the data obtained therefrom appear in Table I. The extent of plutonium purification from gamma-active fission products is represented by the decontamination factor (DF) which is defined as:

$$\frac{\text{gamma activity per gram plutonium in original charge}}{\text{gamma activity per gram plutonium in the product}}$$

The second column in the table is the percent of gamma activity from the original charge remaining in the product; the first value in the column is for gross gamma activity.

TABLE I

| | Activities Collected with the Plutonium (Percent of Charge) | Decontamination Factor |
|---|---|---|
| Experiment: | | |
| 1 and 2 | γ, 0.85 | 120 |
| | Zr, 0.05 | 2,000 |
| | Nb, 1.6 | 60 |
| | Sb, 0.3 ¹ | ² 330 |
| | Ru, 3.7 | 27 |
| 3 | γ, 0.07 | 1,400 |
| | Ru, 0.42 | 240 |
| | Sb, NA ³ | |
| 4 and 5 | γ, 0.031 | 3,200 |
| | Ru, 0.82 | 120 |
| | Sb, 0.72 ¹ | ² 140 |

¹ Maximum.
² Minimum.
³ NA=Not analyzed.

In all five runs the fluorinating agent was a mixture of 10 to 90% fluorine in nitrogen. The values in the table for runs 1 and 2 and for runs 4 and 5 are average values. For runs 1 and 2 the plutonium stream from the fluidized bed was collected on beds of sodium fluoride or activated alumina. As seen in the table, the DF for gross gamma was 120, but the DF for ruthenium was only 27.

In run 3 the plutonium stream entered a precooler maintained at 0° C. and then a cold trap maintained at −78° C. The cold trap was isolated from the system, heated to 0° C. and slowly purged with nitrogen gas at a rate of 2 liters per minute. As plutonium hexafluoride sublimed from the solid in the trap the nitrogen gas stream carried it to a bed of sodium fluoride pellets maintained at 350° C. As may be seen by reference to Table I, the DF for gross gamma activity increased more than by a factor of 10. It should be noted at this point that plutonium hexafluoride separation from the cold trap could be effected by vacuum instead of with a carrier gas.

Runs 4 and 5 were similar to run 3 except that the sublimed plutonium hexafluoride was not collected on sodium fluoride but on refractory alumina at 350° C. When the plutonium hexafluoride contacted the alumina it thermally decomposed to plutonium tetrafluoride. The DF for the gross gamma activity was more than twice as large as in run 3 and more than 25 times as great as in runs 1 and 2. The percent of gross gamma activity remaining in the product was less than half of that in run 3 and 27 times less than in runs 1 and 2.

Ruthenium present in the plutonium stream was collected in the precooler, the cold trap and the back traps of sodium fluoride and activated alumina. Three different compounds of ruthenium were tentatively identified as ruthenium pentafluoride, ruthenium oxytetrafluoride and ruthenium hexafluoride. Ruthenium pentafluoride with a vapor pressure at 0° C. of $1.3 \times 10^{-5}$ mm. Hg was the primary compound collected in the precooler. At 0° C. the vapor pressures of ruthenium oxytetrafluoride and ruthenium hexafluoride are $6.3 \times 10^{-2}$ and 23 mm. Hg respectively. The primary compound retained in the cold trap was ruthenium oxytetrafluoride which has a vapor pressure at $-78°$ C. of $3.9 \times 10^{-6}$ while the vapor pressure of ruthenium hexafluoride at $-78°$ C. is $3.2 \times 10^{-2}$. Some of the ruthenium followed the plutonium hexafluoride to the backup traps. Since the vapor pressure of ruthenium hexafluoride at $-78°$ C. is the highest of the three named compounds, most of the ruthenium collected in the back-up traps was the hexafluoride.

It should be apparent that sublimation is an effective method of removing most of the fission products from plutonium. The cold trap temperature and the sublimation temperature depend upon the type of contaminant present and its vapor pressure in relation to the vapor pressure of plutonium hexafluoride. Some plutonium hexafluoride sublamations are advantageously performed at $-60°$ C. and others at $+10°$ C. For instance, molybdenum hexafluoride is preferentially sublimed away from plutonium hexafluoride at temperatures between $-40°$ C. and $-60°$ C. because it is more volatile at those temperatures than plutonium hexafluoride. While 1 or 2% of the plutonium hexafluoride in the trap sublimes with the molybdenum hexafluoride, a very good separation of the molybdenum from the plutonium results. So also, some of the ruthenium hexafluoride, which is also more volatile than plutonium hexafluoride, sublimes with the molybdenum hexafluoride and is therefore separated from the remaining plutonium hexafluoride.

It will be understood that the invention is not to be limited to the details given herein but that it may be modified within the scope of the appended claims.

The embodiments of the invention in which an exclusive property or privilege is claimed are defined as follows:

1. A process for separating plutonium hexafluoride from a gaseous mixture of plutonium hexafluoride and fission product fluorides, comprising: freezing said gaseous mixture to form a solid, subliming the plutonium hexafluoride from the solid and separating said plutonium hexafluoride gas therefrom.

2. The proces of claim 1 wherein the gaseous mixture is frozen at a temperature between about 0° C. and about $-100°$ C.

3. The process of claim 2 wherein the plutonium hexafluoride is sublimed from the solid mixture at a temperature between about $-60°$ C. and about $+10°$ C.

4. The process of claim 3 wherein the sublimed plutonium hexafluoride is removed from the solid by contacting a carrier gas with the solid.

5. The process of claim 4 and further comprising the step of contacting the carrier gas and sublimed plutonium hexafluoride with alumina or solid sodium fluoride.

6. The process of claim 4 and further comprising the step of contacting the carrier gas and sublimed plutonium hexafluoride with alumina maintained at a temperature whereby the plutonium hexafluoride on contact therewith termally decomposes to plutonium tetrafluoride.

7. The process of claim 6 wherein the gaseous mixture is frozen at a temperature of about $-78°$ C., the plutonium hexafluoride is sublimed at about 0° C., the carrier gas is nitrogen gas and the alumina is maintained at about 300° C.

8. In a process of separating uranium and plutonium from each other and fission products contained therewith by oxidizing declad spent nuclear fuel elements to form plutonium dioxide, $U_3O_8$ and fission product oxides, passing bromine pentafluoride upwardly through a fluidized bed containing said oxides whereby uranium hexafluoride and some fission product fluorides volatilize from said bed, thereafter passing fluoride gas upwardly through said bed, whereby plutonium hexafluoride and some fission product fluorides volatize from said bed, the improvement comprising: freezing said plutonium hexafluoride and fission product fluorides in a cold trap at a temperature of less than about $-70°$ C., passing a carrier gas through said cold trap and subliming plutonium hexafluoride from the cold trap.

9. The process of claim 8 wherein the sublimed plutonium hexafluoride gas from the cold trap is contacted with alumina maintained at a temperature sufficient to cause thermal decomposition of the plutonium hexafluoride gas to plutonium tetrafluoride solid.

References Cited

UNITED STATES PATENTS 3,294,493   12/1966   Jonke et al. _____ 23—326

FOREIGN PATENTS 652,609   12/1962   Canada.

OTHER REFERENCES

Nuclear Science Abstract, 17–40691, Study of Microsublimation Apparatus With the Removal of the Vapors by Pomping.

CARL D. QUARFORTH, *Primary Examiner.*

M. J. McGREAL, *Assistant Examiner.*

U.S. Cl. X.R.

23—344, 352